(12) United States Patent
Shi et al.

(10) Patent No.: US 11,474,633 B2
(45) Date of Patent: Oct. 18, 2022

(54) TOUCH CONTROL DISPLAY PANEL, MANUFACTURING METHOD THEREOF, TOUCH CONTROL DISPLAY SCREEN AND SPLICED SCREEN

(71) Applicant: BOE Technology Group Co., Ltd., Beijing (CN)

(72) Inventors: Lubin Shi, Beijing (CN); Fuqiang Li, Beijing (CN); Fangzhen Zhang, Beijing (CN); Wei Qin, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/491,127

(22) Filed: Sep. 30, 2021

(65) Prior Publication Data

US 2022/0244805 A1    Aug. 4, 2022

(30) Foreign Application Priority Data

Feb. 1, 2021    (CN) .......................... 202110135148.6

(51) Int. Cl.
| | | |
|---|---|---|
| *G06F 3/041* | (2006.01) | |
| *G06F 3/0488* | (2022.01) | |
| *G06F 3/14* | (2006.01) | |
| *G09G 3/32* | (2016.01) | |
| *G06F 3/044* | (2006.01) | |

(52) U.S. Cl.
CPC .......... *G06F 3/0416* (2013.01); *G06F 3/0412* (2013.01); *G06F 3/0448* (2019.05); *G06F 3/1446* (2013.01); *G09G 3/32* (2013.01); *G06F 2203/04103* (2013.01); *G09G 2300/026* (2013.01)

(58) Field of Classification Search
CPC .... G06F 3/0412; G06F 3/0416; G06F 3/0448; G06F 3/1446; G06F 2203/04103; G09G 3/32; G09G 2300/026
See application file for complete search history.

(56) References Cited

U.S. PATENT DOCUMENTS

| | | | | |
|---|---|---|---|---|
| 2016/0103549 | A1* | 4/2016 | Lee | G06F 3/0412 345/173 |
| 2017/0357378 | A1* | 12/2017 | Yao | G06F 3/0443 |
| 2020/0089355 | A1* | 3/2020 | Moon | G06F 3/0412 |
| 2020/0174605 | A1* | 6/2020 | Tang | G06F 3/0445 |
| 2020/0333909 | A1* | 10/2020 | Chen | G06F 3/044 |

(Continued)

*Primary Examiner* — Ryan A Lubit
(74) *Attorney, Agent, or Firm* — IPro, PLLC (57) ABSTRACT

The embodiments of the present application disclose a touch control display panel and a manufacturing method thereof, a touch control display screen and a spliced screen. The touch control display panel comprises: A substrate; A driving circuit layer, wherein the driving circuit layer comprises a driving line and a data line, a touch control row electrode and a touch control column electrode, the touch control row electrode is connected to at least one row auxiliary electrode via at least one first via hole, and each row of touch control row electrodes are connected to each other in series via the row auxiliary electrode; the touch control column electrode is connected to at least one column auxiliary electrode through at least one second via, and each column touch control column electrode is connected to each other in series through the column auxiliary electrode.

15 Claims, 7 Drawing Sheets

(56) References Cited

U.S. PATENT DOCUMENTS

2021/0173506 A1* 6/2021 Yoshida ................ G06F 3/0412
2022/0137751 A1* 5/2022 Wang .................. G06F 3/04166
                                                              345/173

* cited by examiner

TOUCH CONTROL DISPLAY PANEL, MANUFACTURING METHOD THEREOF, TOUCH CONTROL DISPLAY SCREEN AND SPLICED SCREEN

CROSS-REFERENCE TO RELATED APPLICATIONS

This application claims priority to Chinese Patent Application No. 202110135148.6 filed in China on Feb. 1, 2021, the entire contents of which are hereby incorporated by reference.

TECHNICAL FIELD

The present application relates to the technical field of touch control. More particularly, the present invention relates to a touch control display panel, a manufacturing method thereof, a touch control display screen and a spliced screen.

BACKGROUND

In the field of display technology, touch control display panel as a new input device has been widely used in many technical fields.

Figure 1:
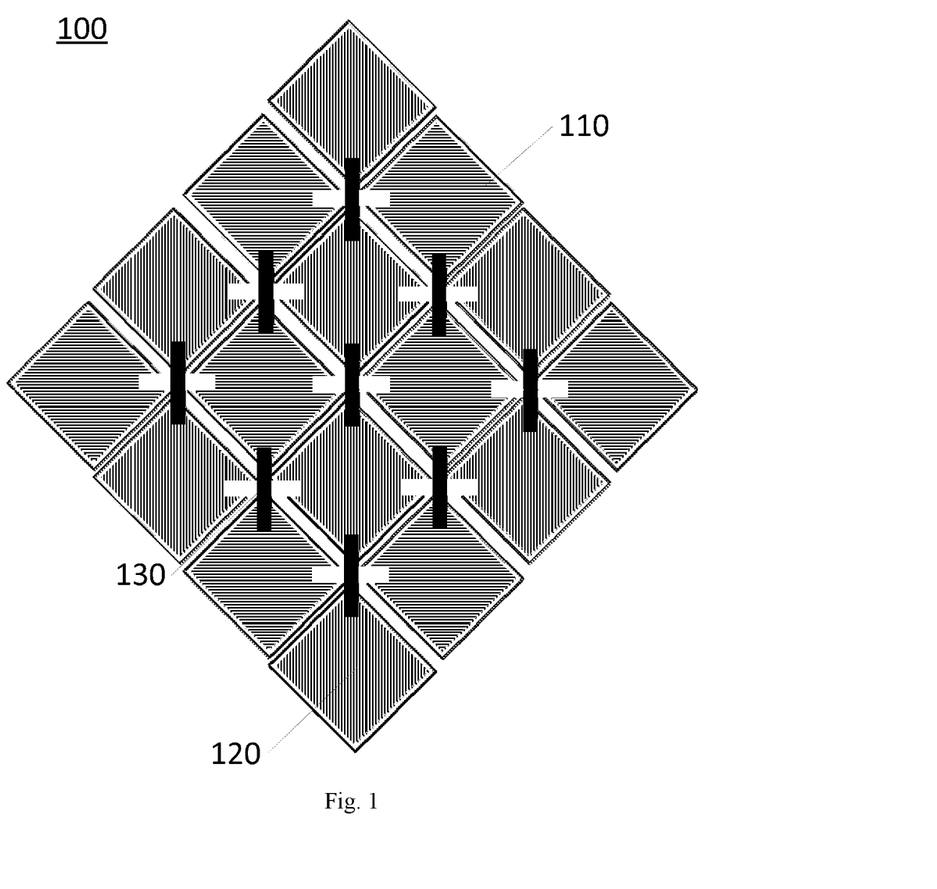
FIG. 1 is a schematic diagram illustrating a structure of an inductive capacitive touch control display panel in the related art.

Classifying in an integrated manner with a display panel, wherein the touch control display panel comprises three forms of In Cell, add on and On Cell, wherein In Cell refers to embedding a touch control panel functional unit into an array substrate; on Cell refers to embedding a touch control functional unit between a color film substrate and a polarizer. The structure as shown in FIG. 1 is an inductive capacitive touch control display panel structure 100 in the relevant art, wherein the touch control display panel structure 100 comprises a substrate and a row electrode 110 and a column electrode 120 arranged on the substrate, and the row electrode 110 and the column electrode 120 are both realized by using a diamond pattern successively connected in series, wherein adjacent row electrodes 110 or column electrodes 120 are connected by means of a bridge 130 arranged on the row electrodes 110 or column electrodes 120. When a user's finger touches the touch control display panel 100, the size of the coupling capacitance of the row electrode 110 or the column electrode 120 changes, so that information about the touched row electrode 110 and column electrode 120 in the touch control display panel 100 can be determined through a positioning and recognition algorithm, thereby achieving a touch control function.

At present, display products are becoming more and more diversified, such as Micro LED and Mini LED display products are receiving more and more attention. Micro LED and Mini LED displays differ greatly from previous display panels such as LCDs, for example the size of the display panel is further increased, and therefore higher demand on the touch control display panel has been raised.

SUMMARY

A first aspect of the present application provides a touch control display panel, comprising:
A substrate;
A driving circuit layer formed on a substrate, wherein the driving circuit layer comprises a driving line and a data line, and further comprises a touch control row electrode and a touch control column electrode, wherein The touch control row electrode is connected to at least one row auxiliary electrode via at least one first via hole, and each row of touch control row electrodes is connected to each other in series via the row auxiliary electrode; the touch control column electrode is connected to at least one column auxiliary electrode via at least one second via hole, and each column touch control column electrode is connected to each other in series via the column auxiliary electrode.

The touch control display panel provided in the first aspect of the present application is provided with row auxiliary electrodes to realize series connection of each row of touch control row electrodes, and is provided with column auxiliary electrodes to realize of each column of touch control row electrodes, which can effectively reduce the resistance-capacitance delay (RC Delay) of the display panel, reduce the adverse effect caused by the resistance-capacitance delay, improve the touch control accuracy and sensitivity of the touch control display panel, thereby improving the touch control effect of the touch control display panel and meeting the requirements of a large-size display screen or a spliced screen.

In a possible implementation, the row auxiliary electrode is arranged on the same layer as the driving line and the column auxiliary electrode is arranged on the same layer as the data line.

By arranging the row auxiliary electrode and the driving line in the same layer, and arranging the column auxiliary electrode and the data line in the same layer, i.e. arranging the row auxiliary electrode and the column auxiliary electrode using the original film material and manufacturing process of the display panel, there is no need to additionally add a new film material, and maximally using the existing film material does not have any effect on the manufacturing process of the existing touch control display panel, does not increase the complexity of the process, and does not increase the cost brought by the process transformation, and at the same time, while realizing the touch control function, does not increase the overall thickness of the display panel, and effectively improves the integration degree of the touch control display panel. Thus, the lightness and thinness of the touch control display screen are facilitated.

In one possible implementation, the touch control row electrode and the touch control column electrode are arranged on the same layer.

The implementation method simplifies the manufacturing process of the touch control row electrode and the touch control column electrode by arranging the touch control row electrode and the touch control column electrode on the same layer; at the same time, the overall thickness of the touch control display panel can be reduced, and the integration of the touch control display panel can be effectively improved, thus facilitating the light and thin of the touch control display screen.

In one possible implementation, the touch control row electrode is connected to a plurality of row auxiliary electrodes via a plurality of first vias, and the touch control column electrode is connected to a plurality of column auxiliary electrodes via a plurality of second vias.

The implementation method further reduces the resistance-capacitance delay (RC Delay) of the display panel by providing a plurality of first via holes and second via holes respectively connected to a plurality of row auxiliary electrodes and column auxiliary electrodes, and improves the touch control accuracy and sensitivity of the touch control display panel, thereby improving the touch control effect of the touch control display panel.

In a possible implementation mode, the touch control display panel further comprises a thin film transistor structure arranged in an array and a light-emitting device corresponding to the thin film transistor structure which are formed on a driving circuit layer; the touch control row electrode and the touch control column electrode are respectively formed with a first opening; and the projection of the first opening on the substrate corresponds to the projection of the light-emitting device on the substrate.

The implementation method, by respectively forming a first opening on the touch control row electrode and the touch control column electrode, avoids the light-emitting device, avoids affecting the chip binding of the display panel and the light emission of the light-emitting device, is well adapted to the display panel, and ensures the display effect of the touch control display panel.

In one possible implementation, the projection of the touch control row electrode on the substrate and the projection of the touch control column electrode on the substrate are of the same size, and are respectively formed with a plurality of first openings, and the projection of the first openings on the substrate corresponds to the projection of a plurality of light-emitting devices on the substrate by one-to-one.

The projection sizes of the touch control row electrode and the touch control column electrode on the substrate in the implementation method are the same, so as to realize that the touch control row electrode and the touch control column electrode are adapted to each other, and the touch control row electrode and the touch control column electrode are aligned with the arrangement mode of the light-emitting that the touch control area can be increased and the touch-control sensitivity can be effectively improved.

In one possible implementation, the projection of the touch control row electrode on the substrate and the projection of the touch control column electrode on the substrate are each diamonds.

In one possible implementation, the touch control display panel further comprises a touch control chip located on the back side, and the touch control row electrode and touch control column electrode are respectively connected to the touch control chip via a side lead of the touch control display panel.

The implementation method is connected to a touch control chip located at the back through a side lead, which can effectively reduce the frame of a touch control display panel while ensuring the touch control function, so as to meet the requirements of a large-size touch control display screen and a spliced screen.

A second aspect of the present application provides a touch control display screen, comprising a touch control display panel as provided in the first aspect of the present application.

A third aspect of the present application provides a spliced screen, comprising a plurality of touch control display screens as provided in the second aspect of the present application.

In one possible implementation, a touch control display panel of the touch control display screen comprises a touch control chip, and the touch control chip comprises a synchronization module for realizing communication synchronization of various touch control display screens.

The implementation method sets a synchronization module in each touch control display panel, so that the touch control chips of different touch control display panels achieve communication synchronization of various touch control display screens via respective synchronization modules, and fully satisfy the touch control requirements of a spliced screen.

A fourth aspect of the present application provides a method for manufacturing a touch control display panel, comprising:

Forming a driving circuit layer on a substrate, wherein the driving circuit layer comprises a driving line and a data line, and further comprises a touch control row electrode and a touch control column electrode, wherein The touch control row electrode is connected to a row auxiliary electrode on the same layer as the driving line via a first via hole, and each row of touch control row electrodes is connected in series via the row auxiliary electrode; the touch control column electrode is connected to a column auxiliary electrode on the same layer as the data line via a second via hole, and each row of touch control column electrodes is connected in series via the column auxiliary electrode.

BRIEF DESCRIPTION OF THE DRAWINGS

A detailed description to the embodiments of the present application will be made in conjunction with the accompanying drawings.

DETAILED DESCRIPTION

In order that this application may be more clearly understood, a further description of this application will now be described, by way of example, with reference to the accompanying drawings. Like parts in the drawings are denoted by the same reference numerals. It is to be understood by persons of ordinary skill in the art that the following detailed description is intended to be illustrative and not restrictive, and that it is not intended to limit the scope of the present application.

In the description of the present application, it should be noted that the terms "upper", "lower", and the like indicate orientations or positional relationships based on the orientation or positional relationships shown in the figures, merely to facilitate and simplify the description of the present application, and do not indicate or imply that the devices or elements referred to must have a particular orientation, be constructed and operated in a particular orientation, and thus should not be construed as limiting the present application. Unless otherwise expressly specified and limited, the terms "mounted", "connected", and "connected" are to be interpreted broadly, e. G. as a fixed connection, as a detachable connection, or as an integral connection; may be a mechanical connection or an electrical connection; it can be directly connected or indirectly connected through an intermediate medium, and can be the communication between two elements. For a person skilled in the art, the specific meaning of the above terms in the present application can be understood according to specific circumstances.

It is further noted that the use of relational terms such as first and second, and the like in the description of this application are used solely to distinguish one entity or action from another entity or action without necessarily requiring or implying any actual such relationship or order between such entities or actions. Furthermore, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises. A" does not, without more constraints, preclude the existence of additional identical elements in the process, method, article, or apparatus that comprises the element.

Currently, for Micro LED and Mini LED display screens, the size of the display screen is larger and the sub-pixel size is larger, so that the resistance capacitance delay (RC Delay) of the touch electrode of the touch control display panel is further increased, seriously affecting the touch effect of the touch control display screen, such as the touch accuracy and sensitivity.

It should be noted that, as the size of the display panel increases and the resolution increases, the RC delay on the touch driving electrode and the touch sensing electrode becomes one of the key factors restricting a large-sized touch screen, specifically, R is the resistance of the touch driving electrode and the touch sensing electrode, and C is determined by the coupling capacitance Cm and the parasitic capacitance, etc. A large resistance-capacitance delay may seriously affect the touch effect of a touch control display panel, for example, the accuracy and sensitivity of touch, and the resistance-capacitance delay is relatively large in a large-sized touch control display panel.

Figure 2:
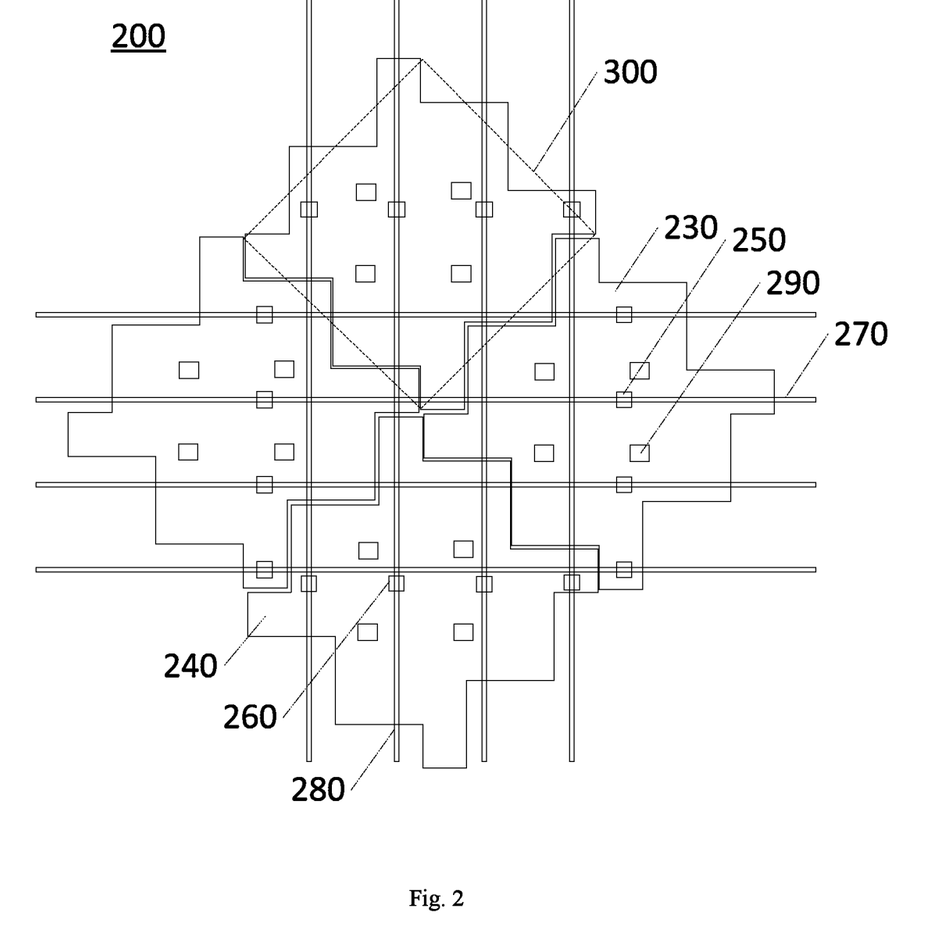
FIG. 2 shows a plan configuration view of a touch control display panel of one embodiment of the present application.
Figure 3:
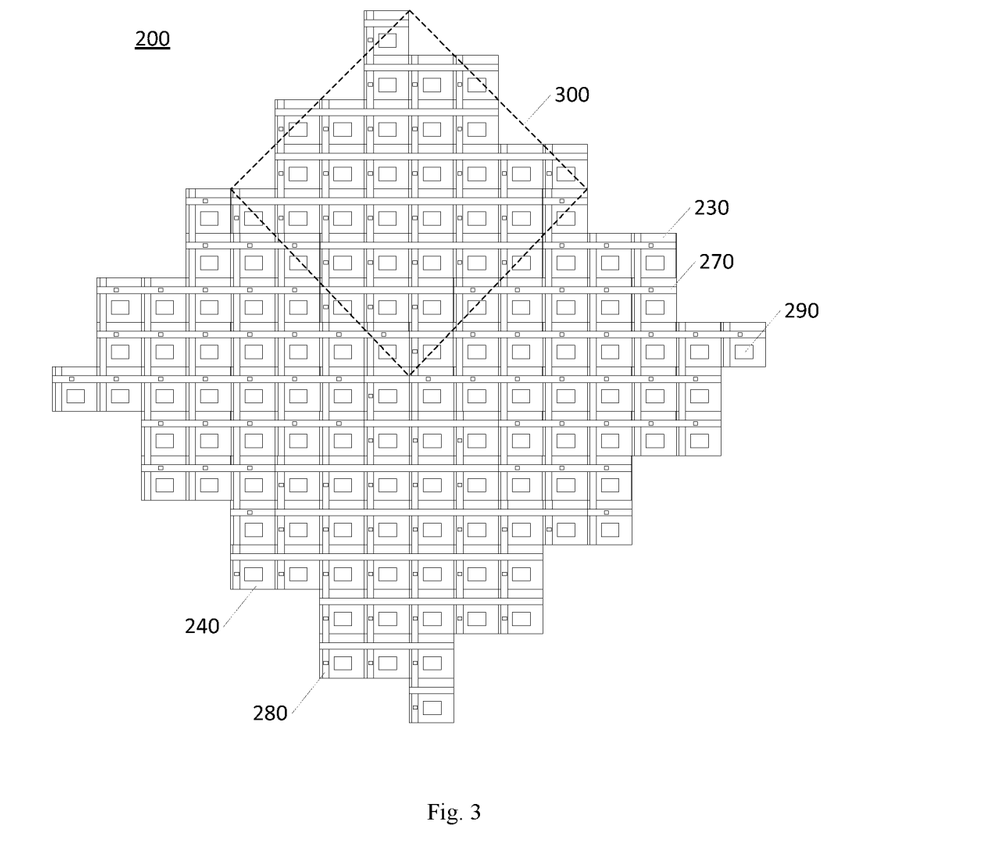
FIG. 3 shows a top view configuration diagram of a touch control display panel of another embodiment of the present application.
Figure 6:
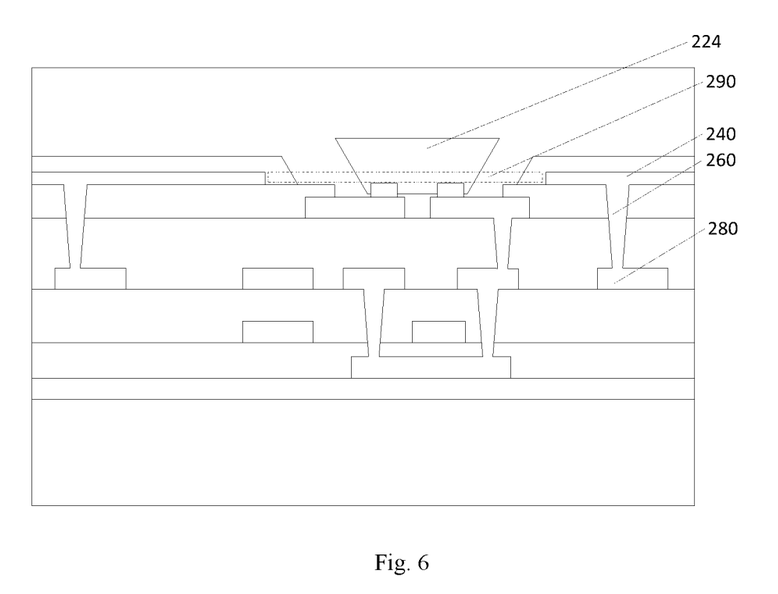
FIG. 6 shows a sectional view at AA' of FIG. 5.

With regard to the problems existing in the related art, one aspect of the present application provides a touch control display panel 200. As shown in FIGS. 2, 3 and 6, the touch control display panel 200 comprises a substrate 210, a driving circuit layer formed on the substrate 210, wherein the driving circuit layer comprises thin film Transistor structures 221 (TFTs) arranged in an array, a driving line 222 and a data line 223. Wherein the driving line 222 is used for being connected to the gate electrode 22101 of the thin film transistor 221 to transmit a driving signal, and the data line 223 is used for being connected to the source electrode 22103 or the drain electrode 2213 of the thin film transistor 221 to transmit a data signal; the touch control display panel 200 further comprises a touch control row electrode 230 and a touch control column electrode 240. In one specific example, the touch control row electrode 230 is used to transmit a touch driving signal, and the touch control column electrode 240 is used to transmit a touch sensing signal, thereby achieving a touch function. In one specific example, the material of the touch control row electrode 230 and the touch control column electrode 240 can be Indium Tin Oxide (ITO) or other metals.

In this embodiment, the touch control row electrode 230 is connected to at least one row auxiliary electrode 270 via at least one first via hole 250, so as to realize the connection between each row of touch control row electrodes 230 via the row auxiliary electrode 270; the touch control column electrodes 240 are connected to at least one column auxiliary electrode 280 through at least one second via 260 to enable connection between each column of the touch control column electrodes 240 through the column auxiliary electrodes 280. In one specific example, the row auxiliary electrodes 270 extend in the row direction of the touch control display panel 200 and the column auxiliary electrodes 280 extend in the column direction of the touch control display panel 200.

The touch control display panel 200 shown in FIG. 2 includes two touch control row electrodes*two touch control column electrodes as an example to describe in detail. It can be understood that in other embodiments, the touch control display panel 200 may comprise N*M touch control electrodes, and the arrangement and connection mode of each touch control electrode may refer to two touch control row electrodes*two touch control column electrodes; the touch control display panel 200 also comprises a row auxiliary electrode 270 extending along the horizontal direction of a row and a column auxiliary electrode 280 extending along the vertical direction, wherein the touch control row electrodes 230 on the left and right sides are connected to the row auxiliary electrode 270 via respective first via holes 250, so that the row electrodes 230 on the left and right sides are successively connected in series via the row auxiliary electrode 270, so that the touch control row electrodes 230 on the row are connected in series; the touch control column electrodes 240 on the upper and lower sides are connected to a column auxiliary electrode 280 via respective second vias 260, and the touch control column electrodes 240 on the upper and lower sides are successively connected in series via the column auxiliary electrode 280 so as to realize the connection of the column auxiliary electrodes 240 of the column.

The touch control row electrode 230 of the touch control display panel 200 is connected in series via a first via hole 250 and a row auxiliary electrode 270, and the touch control column electrode 240 is connected in series via a second via hole 260 and a column auxiliary electrode 280. In this way, the series connection of the touch control row electrodes 230 located in the same row is realized by at least one row auxiliary electrode, and the resistance of the touch control row electrodes located in the same row and connected in series with each other can be greatly reduced; the series connection of the touch control column electrodes 280 located in the same column is realized by at least one column auxiliary electrode, so that the resistance of the touch control column electrodes located in the same column and connected in series with each other can be greatly reduced, so that the resistance-capacitance delay (RC Delay) can be effectively reduced, the adverse effect caused by the resistance-capacitance delay can be reduced, and the touch control accuracy and sensitivity of the touch control display panel 200 can be improved, so that the touch control effect of the touch control display panel 200 can be improved to meet the requirements of a large-size display screen or a spliced screen. It can be understood that the extension direction of the row auxiliary electrodes 270 and the column auxiliary electrodes 280 can also be other directions, as long as the touch control row electrodes 230 and the touch control column electrodes 240 can be successively connected in series by the row auxiliary electrodes 270 and the column auxiliary electrodes 280, which is not further limited in the present application.

In a specific embodiment, the row auxiliary electrode 270 and the driving line 222 are located in the same film layer, and the column auxiliary electrode 280 and the data line 223 are located in the same film layer, that is to say, the row auxiliary electrode 270 and the driving line 222 can be made by the same film-forming process, or even formed by the same patterning process; the column auxiliary electrodes 280 and the data lines 223 may be formed by the same film forming process or even by the same patterning process. It should be noted that the fact that the two patterns are located on the same film layer does not limit the vertical distance between the two patterns and the substrate 210 to be the same, or the thickness of the two patterns is completely the same. In a specific example, the material of the row auxiliary electrodes 270 is the same as the material of the driving lines 222, both being a metal or a metal alloy; the material of the column auxiliary electrodes 280 is the same as that of the data lines 223, and is a metal or a metal alloy. Specifically, the metal or metal alloy is selected from any one or more of Al, Cu, Mo, Ti.

By arranging the row auxiliary electrode 270 and the driving line 222 in the same layer, and arranging the column auxiliary electrode 280 and the data line 223 in the same layer in this embodiment, i.e. arranging the row auxiliary electrode 270 and the column auxiliary electrode 280 using the original film material and manufacturing process of the display panel, there is no need to additionally add a new film material, maximizing the use of the existing film material, simplifying the manufacturing process of the touch control display panel 200, which has no effect on the manufacturing process of the existing touch control display panel, does not increase the complexity of the process, and does not increase the cost brought by the process transformation. At the same time, while realizing the touch control function, reducing the overall thickness of the display panel effectively improves the integration of the touch control display panel 200, thereby facilitating the light and thin of the touch control display screen.

Figure 7:
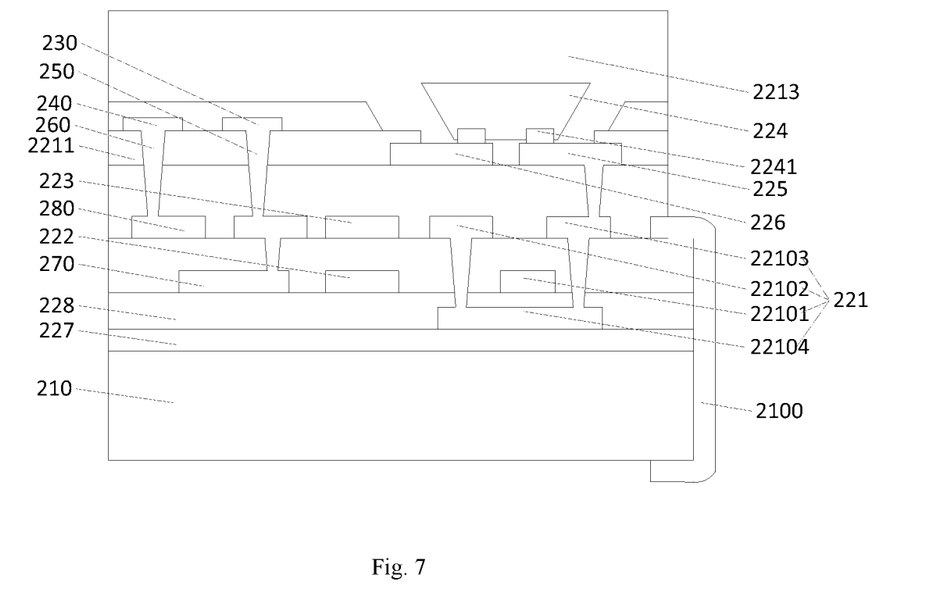
FIG. 7 is a sectional view showing the structure of a touch control display panel of one embodiment of the present application.

In a specific embodiment, the touch control row electrode 230 and the touch control column electrode 240 are formed on the same layer, namely, the touch control row electrode 230 and the touch control column electrode 240 can be formed by the same process. In one specific example, as shown in FIG. 7, the touch control row electrode 230 and the touch control column electrode 240 are located on the same layer, and in another specific example, the touch control row electrode 230 and the touch control column electrode 240 may also be located on different layers, and are prepared using film layer metal materials of different layers. In yet another embodiment, the touch control row electrode 230 and the touch control column electrode 240 can be formed using the same layer of metal material (indium tin oxide or other metals) and the same patterning process.

The implementation method simplifies the manufacturing process of the touch control row electrode 230 and the touch control column electrode 240 by arranging the touch control row electrode 230 and the touch control column electrode 240 in the same layer; at the same time, the overall thickness of the touch control display panel 200 can be reduced, and the integration of the touch control display panel 200 can be effectively improved, thereby facilitating the light and thin of the touch control display screen.

In a specific embodiment, a touch control row electrode 230 is connected to a plurality of row auxiliary electrodes 270 via a plurality of first vias 250, and a touch control column electrode 240 is connected to a plurality of column auxiliary electrodes 280 via a plurality of second vias 260. In the embodiment shown in FIGS. 2 and 3, the touch control display panel 200 includes a plurality of row auxiliary electrodes 270 extending in a horizontal direction of a row and a plurality of column auxiliary electrodes 280 extending in a vertical direction, for example, 4, 6, 8, and 12. Each touch control row electrode 230 is provided with a corresponding first via hole 250 corresponding to each row auxiliary electrode 270, each touch control column electrode 240 is provided with a corresponding second via hole 260 corresponding to each column auxiliary electrode 280, and on each row auxiliary electrode 270, the touch control row electrodes 230 on the left and right sides are connected in series via the respective first via holes 250, so that the two touch control row electrodes 250 on the left and right sides are connected in parallel in multiple rows; on each column auxiliary electrode 280, the touch control column electrodes 240 on the upper and lower sides are connected in series via respective second vias 260, so that multiple columns of the touch control column electrodes 240 on the upper and lower sides are connected in parallel.

The implementation method enables the touch control row electrode 230 to realize multi-row parallel connection by providing a plurality of first via holes 250 and row auxiliary electrodes 270, and enables the touch control column electrode 240 to realize multi-column parallel connection by providing a plurality of second via holes 260 and column auxiliary electrodes 280, thereby further reducing the resistance capacitance delay (RC delay) of the touch control row electrode 230 and the touch control column electrode 240, improving the touch control accuracy and sensitivity of the touch control display panel 200, and thereby improving the touch control effect of the touch control display panel 200.

Figure 5:
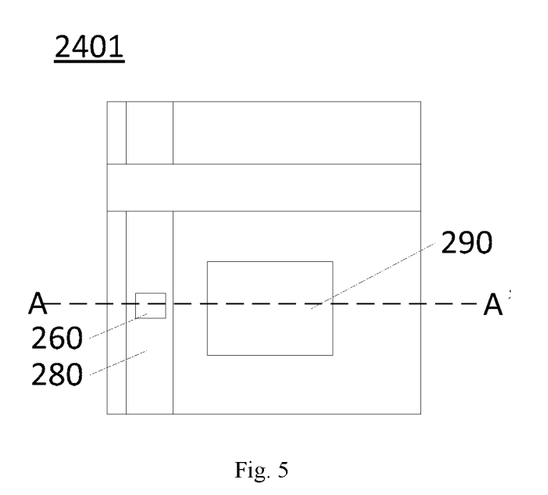
FIG. 5 shows a schematic diagram of the structure of a column electrode cell touching a column electrode according to one embodiment of the present application.

In a specific embodiment, the touch control display panel 200 further comprises a light-emitting device 224 corresponding to the thin film transistor structure 221 formed on the driving circuit layer, the touch control row electrode 230 and the touch control column electrode 240 are respectively formed with a first opening 290, and the projection of the first opening 290 on the substrate 210 corresponds to the projection of the light-emitting device 224 on the substrate 210, namely, as shown in FIGS. 5, 6 and 7. FIG. 6 is a cross-sectional view at AA' in FIG. 5, wherein the dotted box in FIG. 6 is the first opening 290 on the touch control column electrode 240 shown in FIG. 5, and the first opening 290 on the touch control row electrode 230 is the same as the first opening 290 on the touch control column electrode 240, which will not be described again. The touch control row electrode 230 and the touch control column electrode 240 are hollowed out at a binding area corresponding to the light-emitting device 224 so as to form a first opening 290, wherein the first opening 290 is arranged around the light-emitting device 224, and the light-emitting device 224 is exposed from the first opening 290, thus complying with the existing manufacturing process, and not affecting the later binding of the light-emitting device 224 to the display panel and the light output of the light-emitting device 224. A first opening 290 is respectively formed on the touch control row electrode 230 and the touch control column electrode 240 so as to avoid the light-emitting device 224, so as to avoid affecting the chip binding of the display panel and the light emission of the light-emitting device 224, thereby ensuring the display effect of the touch control display panel 200.

It should be noted that the cross-section of the structure of the touch control display panel shown in FIG. 7 is merely a schematic illustration, mainly for explaining the connection relationship between the touch control row electrode and the touch control column electrode and the row auxiliary electrode and the column auxiliary electrode respectively, the relationship between the touch control row electrode and the touch control column electrode and other film structures, and the corresponding relationship between the first opening and the light-emitting device.

In one particular example, the light-emitting device 224 can be a miniature inorganic light emitting diode, such as a current mode light emitting diode, such as a Micro Light Emitting Diode (Micro LED) or a Mini Light Emitting Diode (Mini LED). Wherein the Micro LED and the Mini LED are both based on a tiny LED crystal particle as a pixel light-emitting point, and the difference is that the Micro LED is a 1-10 micron LED crystal used to realize a display screen with pixel particles with a size of 0.05 mm or less; mini LEDs use LED crystals on the order of tens of microns to achieve a display screen with 0.5-1.2 mm pixel particles.

Micro LEDs are similar to OLEDs and are self-emitting display devices. Micro LEDs consume less power, only 10% of LCDs and 50% of OLEDs. In addition, compared to an OLED also belonging to a self-emitting display, the brightness is three times higher than that of an OLED at the same power, with better material stability and no image retention. The material of the LED part in Micro LED technology is an inorganic gallium nitride material, which is commonly used in common LED lighting products. This technique can reduce the need for polarization and encapsulation layers, allowing the display panel to be thinner. The components of the Micro-LED are therefore small, less than 100 mum in width.

In another specific example, the light-emitting device 224 may also be an Organic Light Emitting Diode (OLED) comprised of an anode, an organic light emitting material layer, and a cathode. A source electrode 22103 or a drain electrode 22102 of the thin film transistor 221 is connected to one pole of the light-emitting device 224 through the pixel electrode 225, and the other pole is connected to the common electrode 226. Thus, light output of a specific brightness is realized.

In a specific embodiment, the projection of the touch control row electrode 230 on the substrate 210 and the projection of the touch control column electrode 240 on the substrate 210 are of the same size, and a plurality of first openings 290 are respectively formed, and the projection of the plurality of first openings 290 on the substrate 210 corresponds to the projection of the plurality of light-emitting devices 224 on the substrate 210 by one-to-one. As shown in FIG. 2, the size and shape of the projection of the touch control row electrode 230 on the substrate 210 and the projection of the touch control column electrode 240 on the substrate 210 are both the same, and at the same time, the projection of a plurality of first openings 290 of the touch control row electrode 230 and the touch control column electrode 240 on the substrate 210 corresponds to the projection of a plurality of light-emitting devices 224 on the substrate 210, so as to realize that the touch control row electrode 230 and the touch control column electrode 240 are adapted to the light-emitting devices 224, and ensure that adjacent touch control row electrodes 230 and the touch control column electrodes 240 are closely attached, and there is no gap; while effectively expanding the touch control area and improving the touch control sensitivity, the touch control row electrode 230 and the touch control column electrode 240 are aligned with the light-emitting device 224, which will not affect the binding and light output of the light-emitting device 224. In yet another specific example, the projection of the touch control row electrode 230 on the substrate 210 and the projection of the touch control column electrode 240 on the substrate 210 are respectively in a diamond shape, that is to say, in the example of the touch control row electrode 230 and the touch control column electrode 240 as shown in FIGS. 2 and 3, on the basis of the original diamond shape 300, a raised portion and a recessed portion are correspondingly formed at the edge of four sides of the diamond shape 300; the raised portion and the recessed portion respectively correspond to the raised portion and the recessed portion of the surrounding touch control row electrode 230 or touch control column electrode 240, so as to form a rhombus-like shape composed of a plurality of rectangles, wherein the rhombus-like shape in this embodiment can ensure avoiding binding and light output of a plurality of light-emitting devices corresponding thereto, and at the same time, the shape can better adhere to the adjacent touch control row electrode 230 and touch control column electrode 240, ensuring that no gap occurs, and further expanding the touch control area.

Figure 4:
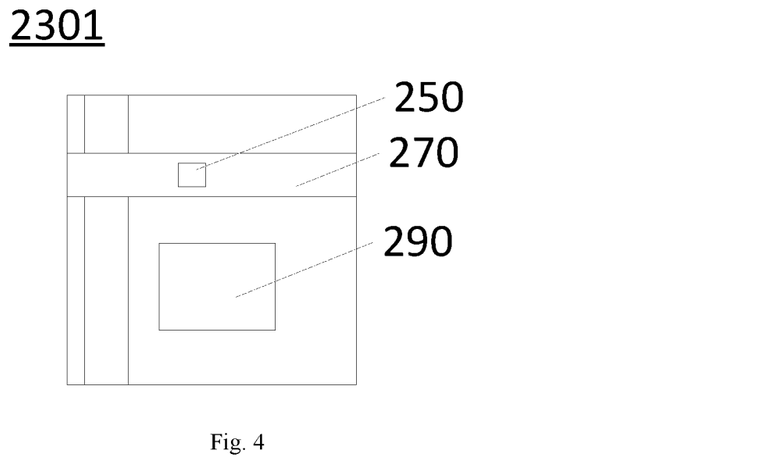
FIG. 4 shows a schematic diagram of the structure of a row electrode cell touching a row electrode of an embodiment of the present application.

In a specific embodiment, as shown in FIGS. 3-5, a touch control row electrode 230 comprises a plurality of touch control row electrode units 2301, as shown in FIG. 4, for example, 32, 64 and 128; the touch control column electrode 240 comprises a plurality of touch control column electrode units 2401, as shown in FIG. 5, for example, 32, 64 and 128; the touch control display panel comprises a plurality of light-emitting devices 224, such as 32, 64 and 128, that is to say, the dimensions of each touch control row electrode unit 2301 and each touch control column electrode unit 2401 are consistent with the dimensions of the light-emitting devices 224, that is to say, each touch control row electrode unit 2301 and each touch control column electrode unit 2401 respectively cover each light-emitting device 224, and each touch control row electrode unit 2301 and each touch control column electrode unit 2401 is formed with a first opening 290 corresponding to each light-emitting device 224 so as to avoid the light-emitting devices 224; the first opening 290 corresponds to the light-emitting device 224, and the arrangement manner of the touch control row electrode unit 2301 and the touch control column electrode unit 2401 is the same as the arrangement manner of the light-emitting device 224, so that the sensitivity of touch control can be further improved.

In a specific embodiment, the touch control display panel 200 further comprises a touch control chip located on the back side, and the touch control row electrode 230 and the touch control column electrode 240 are respectively connected to the touch control chip via a side lead 2100 of the touch control display panel 200. The touch control chip is electrically connected to the touch control row electrode 230 and the touch control column electrode 240 respectively, and the touch control chip is used for determining a touch position by detecting the size of the capacitance between the touch control row electrode 230 and the touch control column electrode 240 when the touch control display screen is touched. Specifically, the touch control chip respectively applies a touch control driving signal to the touch control row electrode 230 and a touch control induction signal to the touch control column electrode 240, and by detecting output signals of the touch control row electrode 230 and the touch control column electrode 240, a capacitance change between the touch control row electrode 230 and the touch control column electrode 240 is obtained. In a specific implementation, a touch control chip can distinguish whether a touch control display screen is touched or pressed by the time point of the touch and the press being different, or by the magnitude of the capacitance change generated by the touch and the press being different. The embodiment connects the touch control row electrode 230 and the touch control column electrode 240 with the touch control chip located at the back side respectively via the side lead 2100, which can effectively reduce the frame of the touch control display panel 200 while ensuring the touch control function, so as to satisfy the requirement of a large-size spliced screen.

According to the touch control display panel provided in the embodiments of the present application, the touch control display panel realizes the series connection of each row of touch control row electrodes by providing row auxiliary electrodes and realizes the series connection of each column of touch control column electrodes by providing column auxiliary electrodes, which can effectively reduce the resistance-capacitance delay (RC Delay) of the display panel, reduce the adverse effect caused by the resistance-capacitance delay, improve the touch control accuracy and sensitivity of the touch control display panel, thereby improving the touch control effect of the touch control display panel and meeting the requirements of a large-size display screen or a spliced screen.

Another aspect of the present application provides a touch control display screen, a touch control display panel 200 as provided in the above embodiments.

Another aspect of the present application provides a spliced screen, comprising a plurality of touch control display screens as provided in the above-mentioned embodiments, wherein the spliced screen can be applied to any display device with a display function, such as electronic paper, a mobile phone, a tablet computer, a television, a display, a notebook computer, a digital photo frame and a navigator, and the present embodiment is not limited thereto.

In a specific embodiment, a touch control display panel 200 of a touch control display screen comprises a touch control chip, and a touch control row electrode 230 and a touch control column electrode 240 are respectively connected to the touch control chip via a side lead 2100 of the touch control display panel 200; in addition, the touch control chip comprises a synchronization module for realizing communication synchronization of each touch control display screen. In one example, the synchronization module can be a crystal oscillator module arranged in the touch control chip, and the communication synchronization of each touch control display screen is realized via a clock signal of the crystal oscillator module 2120. The embodiment provides a synchronization module in each touch control display panel 200, so that the touch control chips of different touch control display panels 200 achieve communication synchronization of various touch control display screens via respective synchronization modules, so as to fully satisfy the touch control a spliced screen.

Another aspect of the present application provides a method for manufacturing a touch control display panel 200, as shown in FIGS. 8-11, the method comprising:

Forming a driving circuit layer on the substrate 210, wherein the driving circuit layer comprises a driving line 222 and a data line 223, and further comprises a touch control row electrode 230 and a touch control column electrode 240, wherein The touch control row electrode 230 is connected to a row auxiliary electrode 270 on the same layer as the driving line 222 via the first via hole 250, and each row of touch control row electrodes 230 is connected in series via the row auxiliary electrode 270; the touch control column electrode 240 is connected to a column auxiliary electrode 280 on the same layer as the data line 223 via the second via hole 260, and each row of touch control column electrodes 240 is connected in series via the column auxiliary electrode 280.

In a specific embodiment, the manufacturing method comprises the following specific steps:

Forming a buffer layer 227 on the substrate 210, and forming an active layer 22104 of the thin film transistor 221 on the buffer layer 227 by a patterning process;

A gate insulating layer 228 is provided overlying the active layer 22104, and in one particular example, the material of the gate insulating layer 228 may be, for example, one or more of SiO/SiN/SiON or the like.

Figure 8:
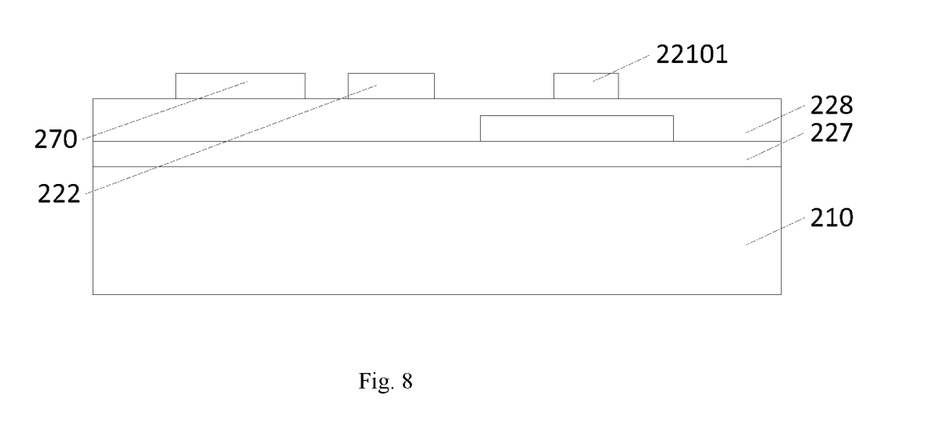
FIGS. 8-11 are structural cross-sectional views corresponding to main steps of a method for manufacturing a touch control display panel according to an embodiment of the present application.

A gate electrode 22101 of the thin film transistor 221, a driving line 222 connected to the gate electrode 22101 and a row auxiliary electrode 270 are formed on the gate insulating layer 228, wherein the row auxiliary electrode 270 is arranged on the same layer as the driving line 222 and the gate electrode 22101. In one specific example, the material of the row auxiliary electrodes 270 and the gates 22101 may be a metal such as Al/Cu/Mo/Ti or an alloy to form a structure as shown in FIG. 8.

Forming an interlayer dielectric layer 229 covering the row auxiliary electrode 270, the driving line 222 and the gate 22101 of the thin film transistor 221, and forming a via hole on the interlayer dielectric layer 229 by a patterning process, so as to expose the row auxiliary electrode 270 and the active layer 22104 of the thin film transistor 221, respectively. In one particular example, the material of the interlayer dielectric layer 229 may be, for example, one or more of SiO/SiN/SiON, etc.

Figure 9:
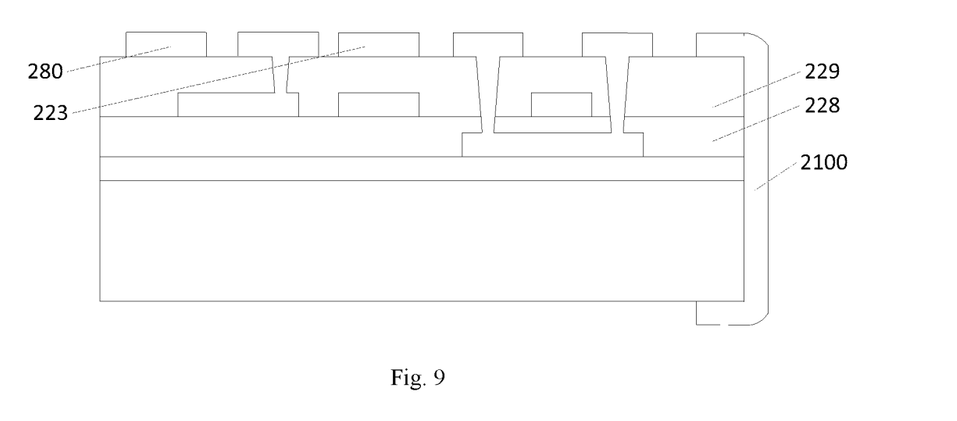

A source electrode 22103 and a drain electrode 22102 electrically connected to the active layer 22104 of the thin film transistor 221, a data line 223 connected to the source electrode 22103 or the drain electrode 22102 of the thin film transistor 221, a column auxiliary electrode 280 and an intermediate layer connected to the row auxiliary electrode 270 are formed on the interlayer dielectric layer 229 to form a structure as shown in FIG. 9. In a specific embodiment, the column auxiliary electrode 280 is provided in the same layer as the data line 223, the source electrode 22103, and the drain electrode 22102. In yet another specific embodiment, the source electrode 22103, the drain electrode 22102 and the column auxiliary electrode 280 may be, for example, a metal or an alloy such as Al/Cu/Mo/Ti.

A planarization layer 2210 covering the source electrode 22103 and the drain electrode 22102 and the data line 223 connected to the source electrode 22103 or the drain electrode 22102 of the thin film transistor 221 is formed, and a via hole is formed by a patterning process to expose the source electrode 22103 or the drain electrode 22102. In one particular embodiment, the material of the planarizing layer 2210 may be formed using an organic resin including an acrylic film-forming resin, a phenolic film-forming resin, a vinyl polymer film-forming resin, or a polyimine film-forming resin.

A pixel electrode layer formed on the planarization layer 2210; an electrode of the light-emitting device 224 is formed by a patterning process; and a common electrode 225 and a pixel electrode 226 are formed by a patterning process, with the pixel electrode 226 being connected to a source electrode 22103 or a drain electrode 22102 of the thin film transistor 221 through a via hole on the planarization layer 2210, taking a touch control display panel as shown in FIG. 7 as an example.

A passivation layer 2211 covering the common electrode 226 and the pixel electrode 225 is formed, and a via hole is formed by a patterning process to expose the common electrode 226 and the pixel electrode 225. In one specific example, the material of the passivation layer 2211 may be, for example, one or more of SiO/SiN/SiON or the like.

Figure 10:
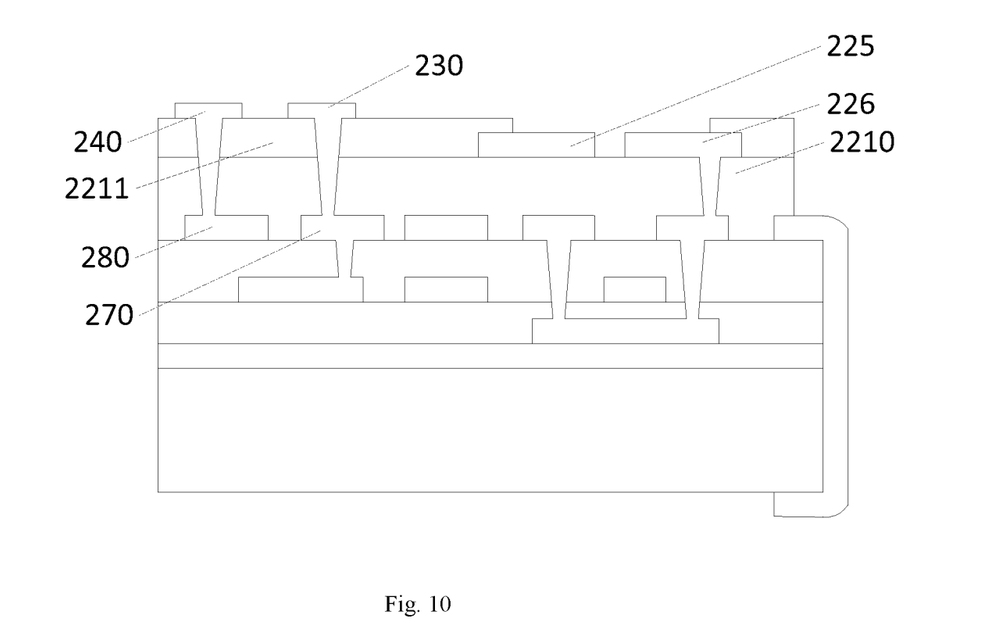

Forming a touch control row electrode 230 and a touch control column electrode 240 located on the passivation layer 2211, wherein the touch control row electrode 230 is connected to a row auxiliary electrode 270 on the same layer as the driving line 222 via a first via hole 250; the touch control column electrode 240 is connected to a column auxiliary electrode 280 on the same layer as the data line 223 via a second via hole 260, and at the same time, a plurality of first openings 290 are formed on the touch control row electrode 230 and the touch control column electrode 240 so as to form a structure as shown in FIG. 10. In one specific example, the material of the touch control row electrode 230 and the touch control column electrode 240 can be Indium Tin Oxide (ITO) or other metals.

A pixel definition layer 2212 is formed overlying the touch control row electrode 230 and the touch control column electrode 240, and a second opening 22121 is formed by patterning the pixel definition layer 2212 to expose the common electrode 226 and the pixel electrode 225. In one particular example, the material of the pixel definition layer 2212 includes, but is not limited to, a black resin material for preventing crosstalk of light emitted from adjacent light-emitting devices 224, affecting the display effect. Wherein the thickness of the pixel definition layer 2212 ranges from 2 μm to 5 μm.

Figure 11:
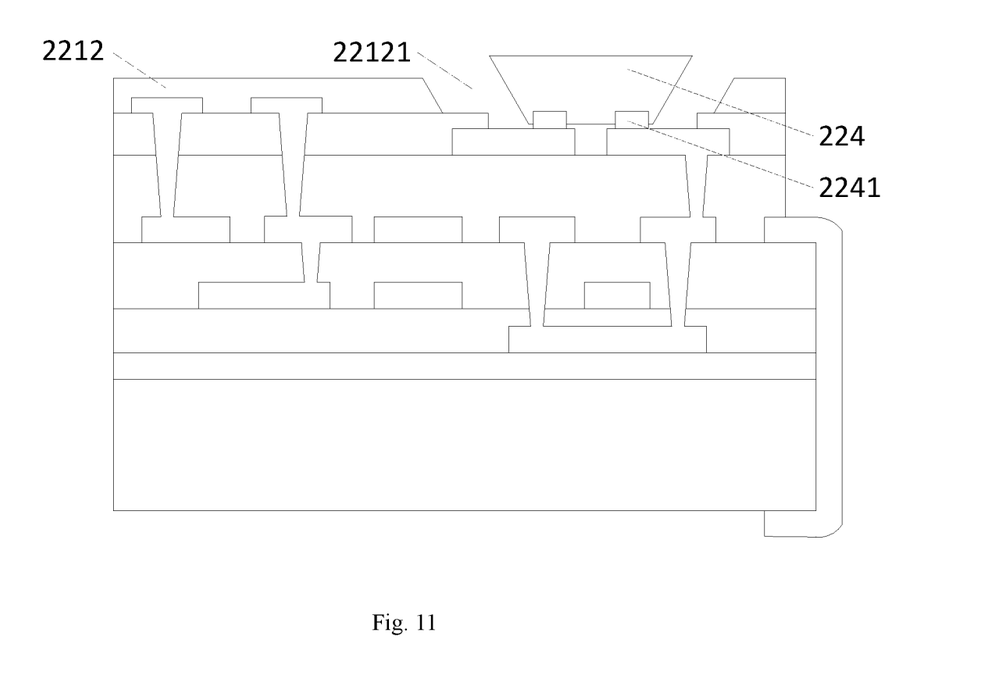

The pixel definition layer 2212 has a second opening 22121 for defining a light emitting area of a light-emitting device 224, and when the light-emitting device 224 is a micro inorganic light emitting diode, pins of the light-emitting device 224 are respectively bound and connected to a common electrode 226 and a pixel electrode 225 to form a structure as shown in FIG. 11.

An encapsulation layer 2213 covering the light-emitting device 224, the pixel definition layer 2212 is formed to form a touch control display panel structure 200 as shown in FIG. 7.

In a specific example, the interlayer dielectric layer 229 is further provided with a first connection pad (not shown in the figure) on the same layer as the data line 223 connected to the source electrode 22103 and the drain electrode 22102, and the source electrode 22103 or the drain electrode 22102 of the thin film transistor 221; the first connection pad is electrically connected to the touch control row electrode 230 and the touch control column electrode 240 respectively; a second connection pad (not shown in the figure) is provided on the side of the substrate 210 facing away from the first connection pad; and the first connection pad and the second connection pad are connected via a side lead 2100 located on the side of the substrate 210. The second connection pad is connected to the touch control chip located on the back side of the substrate 210, namely, the touch control row electrode 230 and the touch control column electrode 240 are respectively electrically connected to the touch control chip via the first connection pad, the side lead 2100 and the second connection pad, so as to connect the front side signal to the metal Pin on the back side to realize the binding between the display chip and the touch control chip. In another embodiment, the side of the side trace 2110 facing away from the substrate 210 is further coated with a protective layer to protect the side trace from exposure to water and oxygen. The material of the protective layer may be a black resin material.

In a specific example, a plurality of touch control display screens comprising the touch control display panel 200 are prepared by a splicing process to obtain a spliced screen, and the plurality of touch control display screens achieve communication synchronization via synchronization modules provided in the respective touch control display panels 200, thereby achieving the display and touch control functions of the spliced screen.

It is obvious that the above-mentioned embodiments of the present application are merely examples for clearly illustrating the present application, rather than limiting the embodiments of the present application. It would be obvious for a person skilled in the art to make various other changes and modifications on the basis of the above-mentioned description, and it is not intended to exhaustively enumerate all the embodiments of the present application, and all the obvious changes and modifications coming from the technical solutions of the present application are still within the scope of the present application.

What is claimed is:

1. A touch control display panel, comprising:
a substrate;
a driving circuit layer formed on a substrate, wherein the driving circuit layer comprises a driving line and a data line, and further comprises a touch control row electrode and a touch control column electrode, wherein
the touch control row electrode is connected to at least one row auxiliary electrode via at least one first via hole, and each row of touch control row electrodes is connected to each other in series via the row auxiliary electrode; the touch control column electrode is connected to at least one column auxiliary electrode via at least one second via hole, and each column touch control column electrode is connected to each other in series via the column auxiliary electrode.

2. The touch control display panel according to claim 1, wherein the row auxiliary electrode is arranged on the same layer as the driving line, and the column auxiliary electrode is arranged on the same layer as the data line.

3. The touch control display panel according to claim 1, wherein the touch control row electrode and the touch control column electrode are arranged on the same layer.

4. The touch control display panel according to claim 1, wherein the touch control row electrode is connected to a plurality of row auxiliary electrodes via a plurality of first vias, and the touch control column electrode is connected to a plurality of column auxiliary electrodes via a plurality of second vias.

5. The touch control display panel according to claim 1, wherein the touch control display panel further comprises thin film transistor structures arranged in an array and light-emitting devices corresponding to the thin film transistor structures formed on a driving circuit layer, the touch control row electrode and the touch control column electrode are respectively formed with first openings, and the projection of the first openings on the substrate corresponds to the projection of the light-emitting devices on the substrate.

6. The touch control display panel according to claim 5, wherein the projection of the touch control row electrode on the substrate and the projection of the touch control column electrode on the substrate have the same size, and are respectively formed with a plurality of first openings, and the projection of the plurality of first openings on the substrate corresponds to the projection of a plurality of light-emitting devices on the substrate by one-to-one.

7. The touch control display panel according to claim 1, wherein a projection of the touch control row electrode on the substrate and a projection of the touch control column electrode on the substrate are diamonds.

8. The touch control display panel according to claim 1, wherein the touch control display panel further comprises a touch control chip on the back, and the touch control row electrode and the touch control column electrode are respectively connected to the touch control chip via a side lead of the touch control display panel.

9. A touch control display screen, comprising the touch control display panel according to claim 1.

10. A spliced screen, comprising a plurality of touch control display screens according to claim 9.

11. The spliced screen according to claim 10, wherein a touch control display panel of the touch control display screen comprises a touch control chip, and the touch control chip comprises a synchronization module for realizing communication synchronization of each touch control display screen.

12. A method for manufacturing a touch control display panel, comprising:
forming a driving circuit layer on a substrate, wherein the driving circuit layer comprises a driving line and a data line, and further comprises a touch control row electrode and a touch control column electrode, wherein the touch control row electrode is connected to a row auxiliary electrode on the same layer as the driving line via a first via hole, and each row of touch control row electrodes is connected in series via the row auxiliary electrode; the touch control column electrode is connected to a column auxiliary electrode on the same layer as the data line via a second via hole, and each row of touch control column electrodes is connected in series via the column auxiliary electrode.

13. The manufacturing method according to claim 12, wherein the forming the driving circuit layer on the substrate comprises:

forming a buffer layer on a substrate, and forming an active layer of a thin film transistor on the buffer layer by a patterning process;

forming a gate insulating layer covering the active layer;

forming a gate electrode of the thin film transistor, a driving line and a row auxiliary electrode connected to the gate electrode on the gate insulating layer, wherein the row auxiliary electrode is arranged on the same layer as the driving line and the gate electrode, and the column auxiliary electrode is arranged on the same layer as the data line, the source electrode and the drain electrode;

forming a source electrode and a drain electrode electrically connected to the active layer of the thin film transistor, a data line and a column auxiliary electrode connected to the source electrode or the drain electrode of the thin film transistor, and an intermediate layer connected to the row auxiliary electrode;

forming a common electrode and a pixel electrode by a patterning process;

forming a passivation layer covering the common electrode and the pixel electrode, and forming a touch control row electrode and a touch control column electrode located on the passivation layer;

forming a pixel definition layer covering the touch control row electrode and the touch control column electrode for defining a light-emitting area of a light-emitting device.

14. The manufacturing method according to claim 13, wherein the touch control row electrode and the touch control column electrode are formed using an indium tin oxide material.

15. The manufacturing method according to claim 13, wherein the light-emitting device is a micro inorganic light emitting diode, and pins of the light-emitting device are respectively bound to the common electrode and the pixel electrode.

* * * * *